United States Patent
Monjas Llorente

(10) Patent No.: US 10,558,717 B2
(45) Date of Patent: Feb. 11, 2020

(54) DATA DISTRIBUTION PLATFORM

(75) Inventor: Miguel Angel Monjas Llorente, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 841 days.

(21) Appl. No.: 14/358,898

(22) PCT Filed: Nov. 18, 2011

(86) PCT No.: PCT/EP2011/070452
§ 371 (c)(1),
(2), (4) Date: Aug. 20, 2014

(87) PCT Pub. No.: WO2013/071978
PCT Pub. Date: May 23, 2013

(65) Prior Publication Data
US 2015/0039635 A1    Feb. 5, 2015

(51) Int. Cl.
*G06F 17/30* (2006.01)
*G06F 16/9535* (2019.01)
*H04L 12/927* (2013.01)

(52) U.S. Cl.
CPC ........ *G06F 16/9535* (2019.01); *H04L 47/805* (2013.01)

(58) Field of Classification Search
CPC ................................................ G06F 17/30867
See application file for complete search history.

(56) References Cited

U.S. PATENT DOCUMENTS

| | | | |
|---|---|---|---|
| 6,792,043 B1 * | 9/2004 | Takahashi | G06F 16/7864 375/240.01 |
| 2007/0103984 A1 * | 5/2007 | Kavuri | G06F 3/0605 365/185.17 |
| 2009/0205008 A1 * | 8/2009 | Wollmershauser | H04N 21/242 725/131 |

FOREIGN PATENT DOCUMENTS

| | | |
|---|---|---|
| CN | 1564552 A | 1/2005 |
| CN | 101296359 A | 10/2008 |
| CN | 101360011 A | 2/2009 |
| CN | 101425165 A | 5/2009 |
| CN | 101441688 A | 5/2009 |
| WO | WO 2008/027653 A1 | 3/2008 |
| WO | WO 2008/092250 A1 | 8/2008 |
| WO | WO 2008092250 * | 8/2008 ............. H04L 12/18 |

OTHER PUBLICATIONS

Office Action and English language machine translation, Chinese Application No. 201180076268.8, dated Aug. 31, 2016.
(Continued)

*Primary Examiner* — Tuankhanh D Phan
(74) *Attorney, Agent, or Firm* — Sage Patent Group

(57) ABSTRACT

In a processing entity receiving one or more streams of data points from at least one data generating device; receiving, from a client device, a stream request indicating at least one of the data streams and including information indicating a stream modification; translating the information indicating a stream modification to selection criteria relative to the data points of the at least one data stream; modifying the at least one data stream by filtering the data stream based on the translated selection criteria; and providing the modified data stream to the client device.

22 Claims, 11 Drawing Sheets

(56) References Cited

OTHER PUBLICATIONS

International Search Report, PCT Application No. PCT/EP2011/070452, dated Mar. 12, 2012.
International Preliminary Report on Patentability, PCT Application PCT/EP2011/070452, dated Jan. 13, 2014.
Madden et al., "Fjording the Stream: An Architecture for Queries over Streaming Sensor Data", *Proceedings of the 18$^{th}$ Internatonal Conference on Data Engineering (ICDE '02)*, Feb. 26, 2002, pp. 555-566.
"About Us—Pachube", downloaded Aug. 18, 2015 from http://web.archive.org/web/201100625023047/http://api.pachube.com/, 3 pp.
"Pachube API Documentation", downloaded Aug. 18, 2015 from http://web.archive.org/web/20110705141628/http://api.pachube.com/, 7 pp.
"Real-Time Open Data Web Service for the Internet of Things—Pachube", downloaded Aug. 18, 2015 from http://web.archive.org/web/20110710023451/http://api.pachube.com/, 2 pp.

* cited by examiner

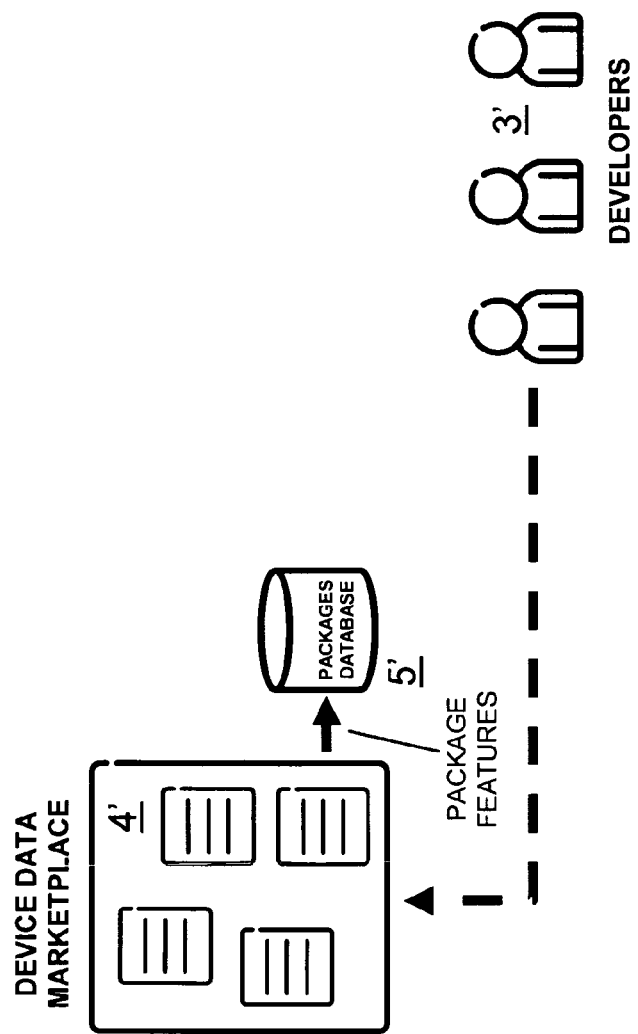

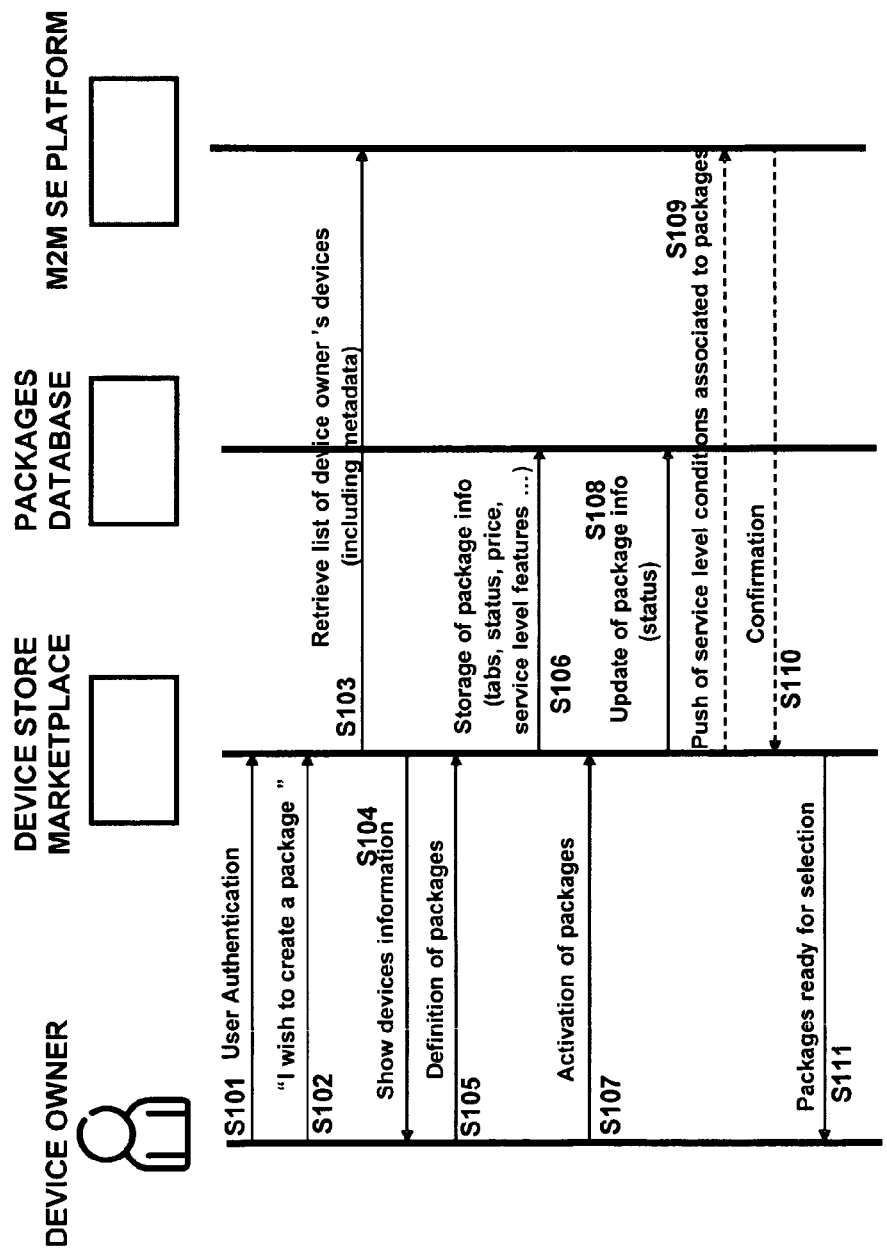

DATA DISTRIBUTION PLATFORM

CROSS REFERENCE TO RELATED APPLICATION

This application is a 35 U.S.C. § 371 national stage application of PCT International Application No. PCT/EP2011/070452, filed on 18 Nov. 2011, the disclosure and content of which is incorporated by reference herein in its entirety. The above-referenced PCT International Application was published in the English language as International Publication No. WO 2013/071978 A1 on 23 May 2013.

TECHNICAL FIELD

The present invention relates to a processing entity for receiving, modifying and providing one or more data streams and a processing unit for generating stream request information comprising information that indicates a stream modification based on specified selection criteria. More specifically, the present invention relates to the distribution of data being input from a plurality of data generation devices and being output to a plurality of client devices. The present invention also relates to respective methods of operation, computer programs, and computer program products, as well as to a system for providing a data distribution platform.

BACKGROUND

Recent decades have seen an enormous evolvement of telecommunication technology and industry. In the beginning, it addressed basic needs, such as the connection of places, offices, and homes, and it was done by means of the fixed-line phone. The following need was the communication of people, achieved by means of the mobile phone. Currently, technology and industry are preparing the connection of "things", which is often referred to as the Internet-of-Things (IoT) or Machine-to-Machine (M2M). It is projected that by 2015, there will be 50 billion devices connected to the network.

A proposed logical architecture of a Machine-to-Machine (M2M) platform involves a so-called M2M connectivity layer and a so-called M2M service enablement layer. The main purpose of the M2M connectivity layer is to guarantee that there is a connection to devices, that such a connection is reliable, that the possibility of roaming is provided, and, in general, that the connectivity infrastructure is optimized for several constraints. The latter may address that the connected devices usually have low mobility (except in transport and logistics-related business), low traffic and there are many devices per owner.

The main purpose of the M2M Service Enablement layer is to ensure context and meaningfulness of the information that the devices are measuring or generating, which can be accessed over application layer protocols (usually over TCP/TP, such as HTTP/XML, and SMS and the like). Thus, service enablement must guarantee a transparent access to devices, regardless of the connectivity technology, a uniform naming of such devices (usually through a URI=unique resource identifier), the exposure of a uniform application plane interface (API) to developers, access control and secure access to devices, quality of service assurance. The latter may include an assignment of priorities to data coming from sensors or throttling its outcomes.

FIGS. 5A and 5B show an approach to M2M Service Enablement. Different organizations may take care of M2M Connectivity and M2M Service Enablement, as coupling between them is not mandatory. Device owners (the entities owning devices and therefore the ones that may grant access to data being measured or generated by devices) use the M2M Service Enablement platforms to access their devices and therefore being able to create applications fulfilling their requirements. For instance, "Example Cars Co." would access the speed of its cars as read from the speedometers through the M2M Service Enablement platform provided by "Example Network Operator" through an API. This information would feed an application collecting such data in order to calculate the average speed of their cars.

An existing service provider which allows owners of sensors and devices to connect sensor data to the web and developers to build their own applications using such data is "Pachube". Its offering is structured around a hierarchy of the following data types: [1] Environments or feeds (a collection of measured data, often at a particular geographical location, defined by the creator of the feed and measured by sensors and devices; an environment can represent measures coming from both physical, such as a room, a mobile device, a building or a forest, and virtual entities, such as a Second Life model, server bandwidth monitoring, etc.), [2] Datastreams (an individual sensor or measuring device within an environment having a unique ID and possibly specifying 'units', e.g. 'watts', as well as user-defined 'tags', e.g. 'fridge_energy'), and [3] Datapoints (a single value of a datastream at a specific point in time, possibly represented by a key-value pair of a timestamp and the value at that time).

A typical usage of the Pachube service may be described in the following example: One wires up a hallway ('environment') with temperature, humidity and CO2 sensors ('datastreams'). One creates a Pachube feed named 'Example Hallway', with three datastreams where the IDs could be: 'temperature', 'humidity' and 'CO2'; which might be tagged 'thermal, non-contact', 'capacitive, SHT21' and 'MG811' respectively; and have units 'Celsius', '% RH' and 'ppm'. Individual datapoints at a point in time might be '23.2', '34' and '3820' respectively.

Pachube's is currently structured to offer to developers its service in three levels (so-called plans): [1] Basic (the developer may access all public feeds, access historical data from feeds up to one month old and access a limited number of datastreams, with a limited number of requests per time unit), [2] Pro (the developer may access all public feeds, access historical data from feeds up to one year old and access a larger amount of datastreams, with a limited but larger number of requests per time unit), and [3] Premium (the developers may access all public feeds and also private feeds, access to all historical data from feeds and access to an even larger set of datastreams with larger limits). However, the following problems can be identified in conventional services: Firstly, developers may not be allowed to selectively access only those data feeds that they are actually interested in. Instead, developers get access to the whole of the existing data feeds, depending on the level the developer has paid for. Therefore, the access control model is very coarse-grained and does not support the possibility of accessing only the feeds the user is interested in. While from a deployment point of view this coarse-grained access control model might be simpler to implement and deploy, such a design decision may have one or more of the following drawbacks: it makes it very difficult to dimension the system. That is, once a level of access is granted to a developer, he may access whatever feed he wishes. Estimates for the dimensioning of the system must take into account such fact, which eventually results in an excess of capacity. Additionally, feeds always provide all the data points from their datastreams. The lack of modulation in the amount of information provided to developers prevents the system from prioritizing clients (developers) and offering them different levels of quality of service.

Secondly, conventional models follow a strict publication-consumption model. In that model, clients (developers) are able to pay for and access device data published in the respective platform. However, they cannot play an active role stating which type of data they would be interested in accessing or which service levels conditions are enough for them in device data being published in the platform.

Accordingly, there is a need for an improved data distribution platform that handles data streams from a plurality of generating devices on an input side, and distributes this data to a plurality of client devices on an output side. More specifically, there is a need for modifying data streams between the input side and the output side so as to more efficiently address the needs of the client devices. There is further a need to allow clients to select the data that they are interested in with a finer granularity and/or to specify offered data packages on their own, that is to at least propose the form of data how it is offered on data distribution platforms.

SUMMARY OF THE INVENTION

The above objects are achieved by the subject-matter of the independent claims. Preferred embodiments are described in the dependent claims.

According to an embodiment of the invention, a processing entity is provided which comprises a processing unit configured to receive one or more streams of data points from at least one data generating device and to also receive a stream request from a client device. The stream request indicates at least one of the data streams and includes information indicating a stream modification. The processing unit is further configured to translate the information indicating a stream modification to selection criteria relative to the data points of the at least one data stream, to modify the at least one data stream by filtering the data stream based on the translated selection criteria; and to provide the modified data stream to the client device.

According to another embodiment of the invention, a processing entity is provided which comprises a processing unit configured to receive authentication information indicating access rights to selection criteria relative to the data points of one of at least one data stream of data points. Access to the selection criteria relative to the data point of the at least one data stream is granted based on the access rights. The processing unit is further configured to receive a command to specify the selection criteria and to generate stream request information indicating a stream request, the stream request indicating at least the one data stream and including information indicating a stream modification based on the specified selection criteria.

According to further embodiments, methods of operation, computer programs, and computer program products, as well as a system for providing a data distribution platform are provided.

BRIEF DESCRIPTION OF THE DRAWINGS

Embodiments of the present invention, which are presented for better understanding the inventive concepts but which are not be seen as limiting the invention, will now be described with reference to the Figures in which:

FIG. 3A to 3D show schematic representations of a data distribution platform according to an embodiment of the present invention;

FIG. 4A to 4D show sequence diagrams of method embodiments of the present invention.

DETAILED DESCRIPTION

Figure 1:
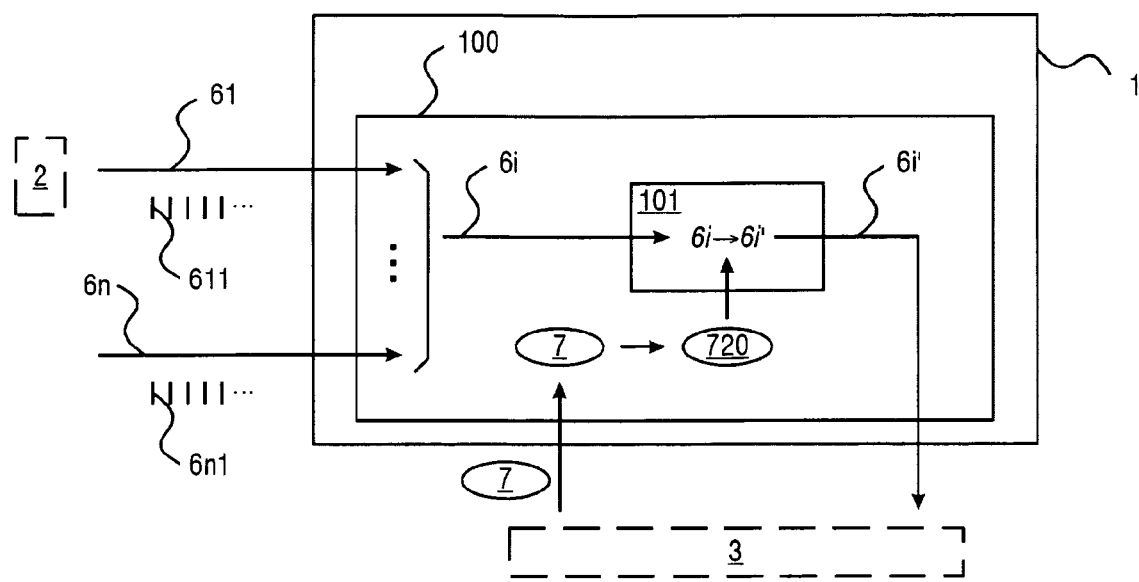
FIG. 1 shows a schematic representation of a processing entity involved in a data distribution platform according to an embodiment of the present invention.

FIG. 1 shows an embodiment in accordance with the present invention. This embodiment includes a processing entity 1 comprising a processing unit 100 which is configured, on an input side, to receive at least one stream 6$i$ from a plurality of streams 61 ... 6$n$ that originate from at least one data generating device 2. The streams 61 ... 6$n$ comprise data points 611 ... 6$n$1 so that, for example, a first data point of stream 61 is identified by data point 611. A data point 611 may thus be a discrete data point within the meaning that one such discrete data point represents meaningful information. For example, data point 611 includes data point identification information, such as an ID or a time stamp, and an associated data point value information, such as a value of a physical quantity associated to the time of the time stamp. In this way, one single data point is able to represent individually and independent from other data points of the stream meaningful information. Following the above example, data point 611 may point to a specific temperature (physical quantity, data point value information) at a specific point in time (time stamp, data point identification information).

The data generating device 2, from which the stream 6$i$ originates, may, for example, be a network connected sensor device. That is, the data generating device 2 may be a sensor that measures a physical quantity and outputs, over a network, a stream of data points representing the measured physical quantity. Examples of such devices are Internet-connected temperature sensors, humidity sensors or $CO_2$ sensors. Additionally, the data generating device (2) may also be a device that measures and outputs "virtual quantities" generated or calculated by a computer. Such a "virtual quantity" may e.g. be a server bandwidth, a data rate, or certain information being generated in an online service or an online computer game. The stream 6$i$ of data points is received at the processing unit 100 of the processing entity 1. In an exemplary embodiment, the processing entity is a server on which the above described M2M Service Enablement layer is implemented and the processing unit is a program running on that server.

In addition to receiving the stream 6$i$ of data points, the processing unit 100 is also configured to receive a stream request 7. Such stream request 7 is usually received from a client device 3, that is, so to speak, a consumer of the data the device 2 provides. The stream request 7 indicates a specific data stream, say data stream 6$i$, and includes information which indicates a stream modification. The modification of the data stream 6$i$ is to obtain a modified stream 6$i$' and takes place in module 101 of the processing unit 100.

More specifically, upon receipt of the stream request 7, the data processing unit 100 translates the information indicating a stream modification to selection criteria 720 relative to the data points of the data stream indicated in the stream request 7. In the exemplary embodiment, the selection criteria may e.g. be a set of policies that can be applied by the M2M Service Enablement layer. On the basis of these selection criteria 720, the processing unit filters the data stream that is indicated in the stream request and thus modifies (101) the stream. Such modification may especially consist in a selection of a subset of data points of the stream.

In an exemplary embodiment, the selection criteria may specify a maximum number of times per hour a client device may be provided with data points, a maximum number of client devices that may access the data points, a maximum sampling frequency of the data points, a timestamp associated with the data points, quality of service parameters associated with the data points, or access rights associated with client devices. In the exemplary embodiment, the stream is modified by removing the data points that do not fall within the defined selection criteria.

In general, the modification according to the embodiments of the present invention is aimed at altering the data stream 6$i$ on a stream level. Thus, a single data point 6$ij$ may be found in both data streams 6$i$ and 6$i'$, i.e. prior to and after modification. However, modification results in omission (filtering) of specific data points 6$ik$ that are originally part of stream 6$i$ but can no longer be found in stream 6$i'$. The filtering may be effected based on the selection criteria 720. Moreover, modification may also include the insertion of data points 6$jj$ into stream 6$i$ (to form stream 6$i'$) that were not part of stream 6$i$ but originate from another stream 6$j$, archived stream data, or from an ad hoc generation in the processing unit 100. The latter may include the calculation of running average data points and the like. In summary, the modified stream 6$i'$ is a stream compiled of data points 6$ii'$ originating from one or more input streams, archived stream or even new generation/calculation.

The modified stream 6$i'$ of data points is provided, on an output side, to the client device 3 in response to the request 7.

In an exemplary modification of the embodiment, the client device 3 is associated with a developer who wishes to use data coming from a sensor to create applications. The stream request 7 may point to a device data packet and may indicate streams from one or more data generating devices 2. The information that is included in the stream request 7 and indicates a stream modification may e.g. consist of service level conditions which may be used to define a subset of data points for which the client desires access.

While the description of the embodiments may refer to "a stream", "a data generating device", and a "client device", it is noted that, naturally, the processing unit can receive a plurality of streams and can receive this plurality of streams from a plurality of data generating devices. Moreover, the processing unit can modify the received plurality of streams and can provide it to a plurality of client devices.

Further, the data streams 61 . . . 6$n$ outputted by the data generating device(s) 2 comprise a plurality of respective data points 611, 6$n$1, . . . . In an exemplary embodiment, the stream of data points is a sequence of tuples used to represent information and each tuple is transmitted on a specific and distinct instant. Tuples comprise at least one data value and, implicitly, one time instant. In this way, the so-called data point identification information is no necessary part of a tuple. To the contrary, identification of a data point may well be established over an arrangement order in a stream. A possible content of tuples consist of one data key and one data value (along with the implicit time instant). The data key describes the type of information the tuple passes on. The data value is the actual value of the information.

In any way, the representation of the tuple issued in instant $t_i$ is the following:

$$T_i = \{k_i, v_i, t_i\}$$

where $k_i$ is the data key, $v_i$ the data value and $t_i$ the issuance time. $k_i$ usually belongs to a predefined vocabulary, shared between the issuer and the receiver. When the receiver of the stream of data points is able to infer the type of data being transferred (because it knows it beforehand or because it is able to find it out) the data key is not needed. Tuples may be multidimensional, including as many elements as needed.

Figure 2:
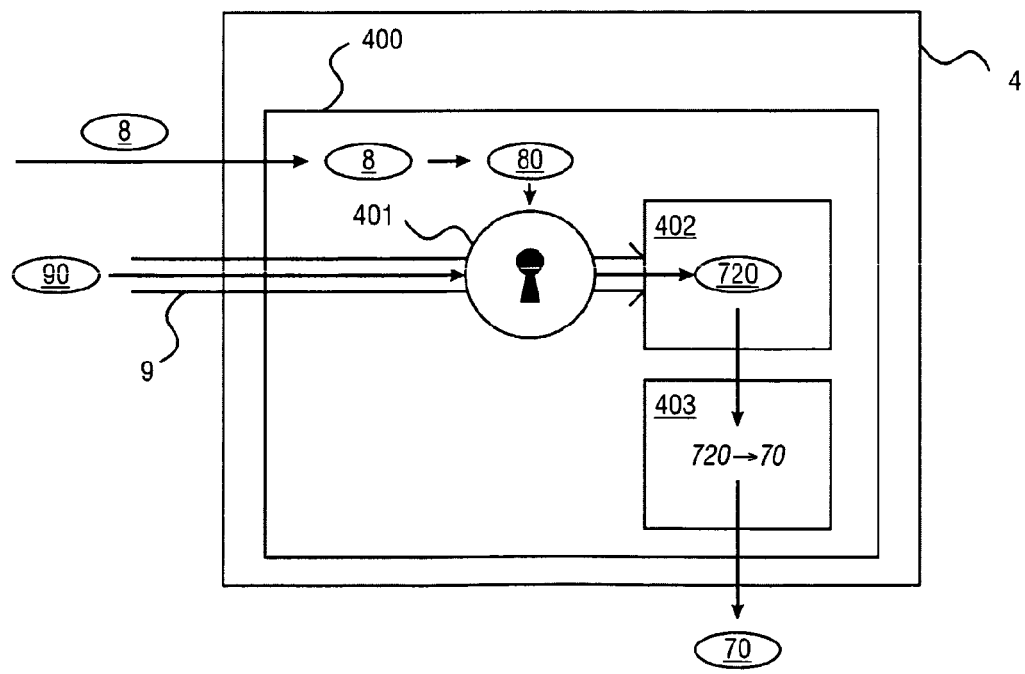
FIG. 2 shows a schematic representation of a processing entity involved in a data distribution platform according to an embodiment of the present invention.

FIG. 2 shows an embodiment in accordance with the present invention. This embodiment includes a processing entity 4 comprising a processing unit 400. The processing entity 4 may interact with the processing entity 1 described in conjunction with FIG. 1. Namely, entity 4 provides stream request information 70 that can be used, for example by a client device, to formulate and/or to issue a stream request 7.

Firstly, the processing entity 4 may allow a user associated with a data generating device (also referred to as a device owner) to define stream requests with regard to the stream of data points outputted by the data generating device. According to further embodiments, the client, wanting to receive a particular subset of stream data points, can then select, among the defined stream requests, the one stream request that suits his requirements the best.

For such purposes, the processing unit 400 of entity 4 is configured to receive authentication information 8 indicating access rights 80 to selection criteria 720 relative to the data points of a stream of data points. In an exemplary modification of the embodiment, the processing entity 4 is a server which implements a data distribution platform (such as a device data store platform). The authentication information 8 may be a set of credentials identifying a device owner previously registered with the platform.

Upon having granted (401) access to the selection criteria 720 based on the access rights 80, the processing unit 400 can receive a command 90 to specify the selection criteria 720. The processing unit then generates stream request information 70, from which a stream request 7 can be derived, that indicates a data stream and includes information indicating a stream modification based on the specified selection criteria.

In an exemplary application, the device owner may send the command 90 to the processing unit 400 in order to perform the specification of the selection criteria 720. The specification may include a selection of pre-existing criteria, an adaption of particular parameters of selection criteria or the definition of new selection criteria. As mentioned before, the selection criteria 720 relate to at least one stream and serve to define a subset of data points. As such, on the basis of the specification of the selection criteria, modification information can be generated that may in other embodiments be used to filter and modify an incoming data stream. The specified selection criteria and the data stream, which the specified selection criteria relate to, can be packaged into a stream request 7.

In a further exemplary application, the stream request information 70 may be a device data package for selected data points of a stream from one specific device, said selection criteria defining particular service level conditions. A client may thus retrieve stream request information 70 from entity 4 (e.g. by means of a purchase process), and use the stream request information 70 to request (7) the desired stream 6*i'* from entity 1. Consequently, in accordance with the above, it becomes possible to define and generate stream request information 70 indicating a stream request 7. In further embodiments, a plurality of defined stream requests may be provided to a client for selection of one or more of the stream requests.

Figure 3A:
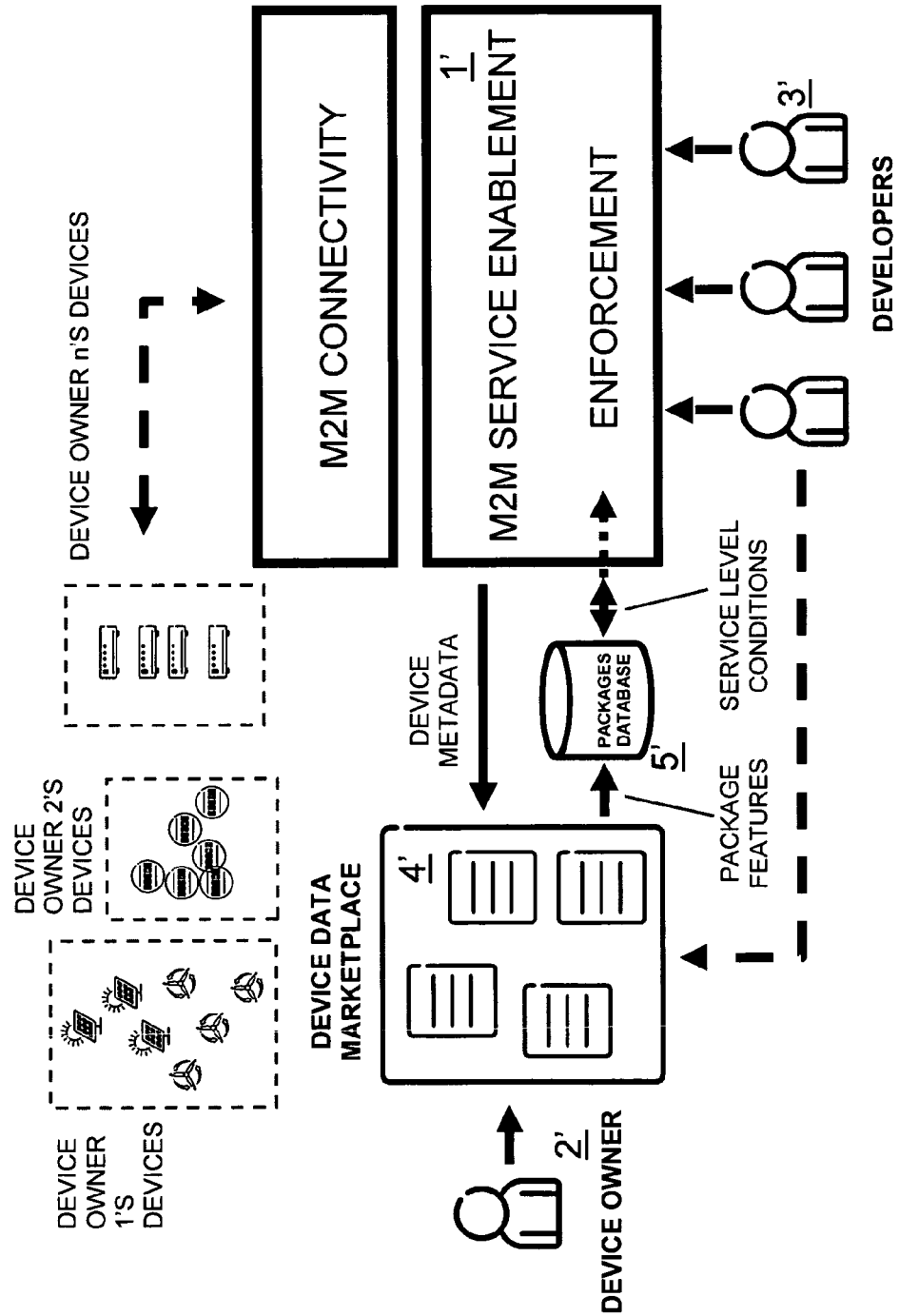

In the following, a further embodiment of the invention will be described with reference to FIGS. 3A to 3D. In this regard, FIGS. 3B, 3C, and 3D emphasize the respective elements of FIG. 3A which are involved in the specific situation. FIG. 3A shows an overview of the exemplary system comprising an M2M Service Enablement Enforcement platform 1' corresponding to the processing entity 1 as described in conjunction with FIG. 1. The illustrated system further comprises a Device Data Marketplace (also referred to as Device Data Store) 4' corresponding to a further embodiment of the processing entity 4 described in conjunction with FIG. 2. Additionally, the device owners 2' own devices that generate a data stream and correspond to the data generating devices 2 of FIG. 1. Developers 3' are associated with the client devices 3 and are the recipients of modified data streams.

At first, the Device Data Store 4' will be described. The main component of such Device Data Store may be a Device Data Marketplace in which device owners may be able to create so-called device data packages (packages for short). Such packages may be not only be assigned with a geolocation or tags, as in the Pachube case (for instance, data provided by meteorological stations deployed in Madrid by the municipality may be defined with tags "Madrid", "meteorology"; if more fine-grained, data can be described with tags "Madrid" and "temperature", "wind speed", "pollution", "humidity", depending on the type of sensor), but also service level conditions that rule the way data coming from sensors will be offered to developers. Examples of such service level conditions can be the maximum number of clients per hour (concurrent or not), the sampling frequency, how fresh data is (that is, if the access to device data is performed in real-time or by accessing a cache recording past values of data). In this way, said service level conditions correspond to the selection criteria of other embodiments such as the criteria 720 as described in conjunction with FIGS. 1 and 2.

In a further embodiment, device data packages may also be given a price. It may be usually dependent on the service level conditions (a basic package will have a low price or even be free; a premium one will be more expensive). Device data packages descriptions may be made available in the Device Data Marketplace so that developers can search for suitable packages (for instance, introducing and combining different parameters such as tags, location, price, and service level conditions) and purchase them.

Following this approach, developers are not given access to the whole of device data but only to the specific packages they are interested in (in terms of content, price and service level conditions).

Figure 3B:
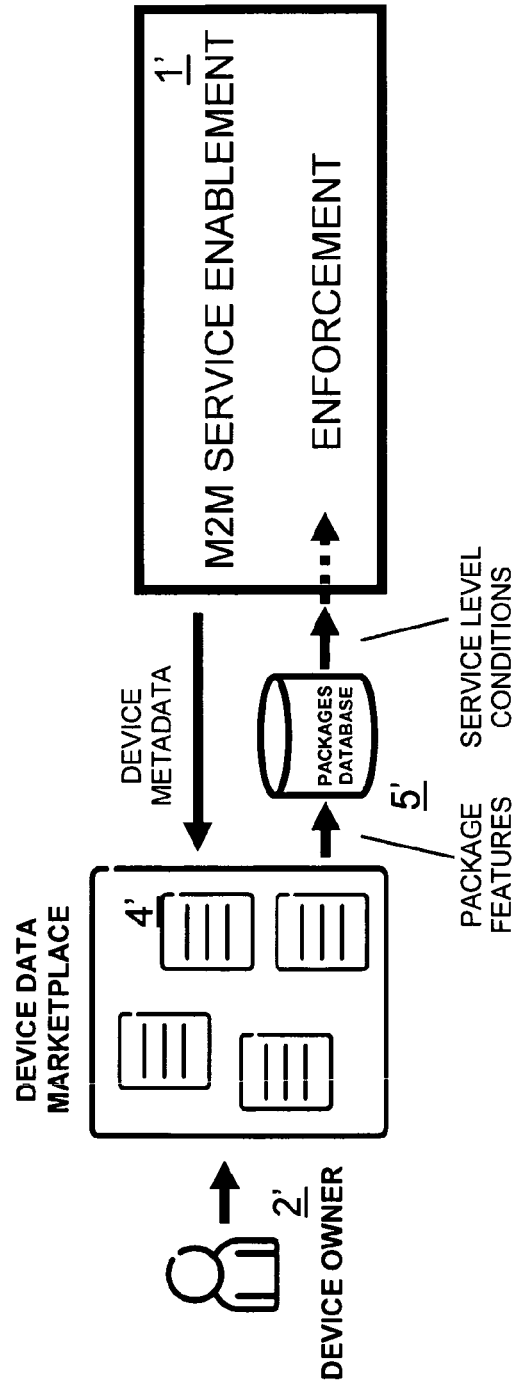

As shown in FIG. 3B, the Device Data Marketplace 4' may also interwork with the M2M Service Enablement platform 1', since it is the one that provides actual access to data coming from sensors. When device owners set the service level conditions, such conditions are translated into policies the M2M Service Enablement platform can use and feed to said platform. Thus, the M2M Service Enablement platform is able to enforce the service level conditions.

That way, on one hand, the dimensioning of the M2M Service Enablement platform can be optimized. On the other hand, device owners may also plan its offer creating device data packages with different service levels so that their devices are not overloaded with queries coming from application developers.

Additionally, as shown in FIG. 3B, the market place 4' may enable developers to request device data packages that have not been defined by device owners. Besides full-fledged device data packages, device owners may define tentative device data packages, without service level conditions (it may be possible to define maximum values) and different price options so that developers may request the creation of actual service packages offering a given price.

The main roles involved in the exemplary embodiment are the following. Device Owner: the actual owner of devices 2, 2'. The one that makes a decision on sharing the information coming from those devices 2, 2' with third parties so that they can develop applications. Device Data Store operator: the owner of the Device Data Store. M2M Service Enablement platform operator: the entity in charge of actually making available data coming from sensors through an API to third parties. It may be assumed that the operator of Device Data Store is the same as the one of the M2M Service Enablement platform. Developer: those wishing to use data coming from sensors to create applications. The developers may generate those applications for client devices 3 that receive modified data streams, whilst the application use and process the data.

The data distribution platform aims to provide a platform for the exhibition of packages of data coming from data generating devices, such as sensors, to developers interested in using such data for the creation of applications running on clients. This platform, which may be referred to as Device Data Marketplace, provides the means for: [a] Device Owners to review the devices supported by the M2M Service Enablement platform and the data being provided by them (in terms of semantics, protocol and service level conditions), and thus create and activate device data packages comprising data coming from specific sensors, with specific tags, price and service level conditions. [b] Device Owners to create tentative device data packages without actual service level conditions and prices (but with maximum values of service level conditions and a range of prices). [c] Developers to search for suitable device data packages. They will be able to look for tag, location, price, service level conditions and combinations of the aforementioned options. [d] Developers to search for tentative device data packages in a similar way as with full-fledged packages and ask for the creation and activation of said device data packages. [e] Device Owners for receiving request for the creation of device data packages.

Figure 3D:
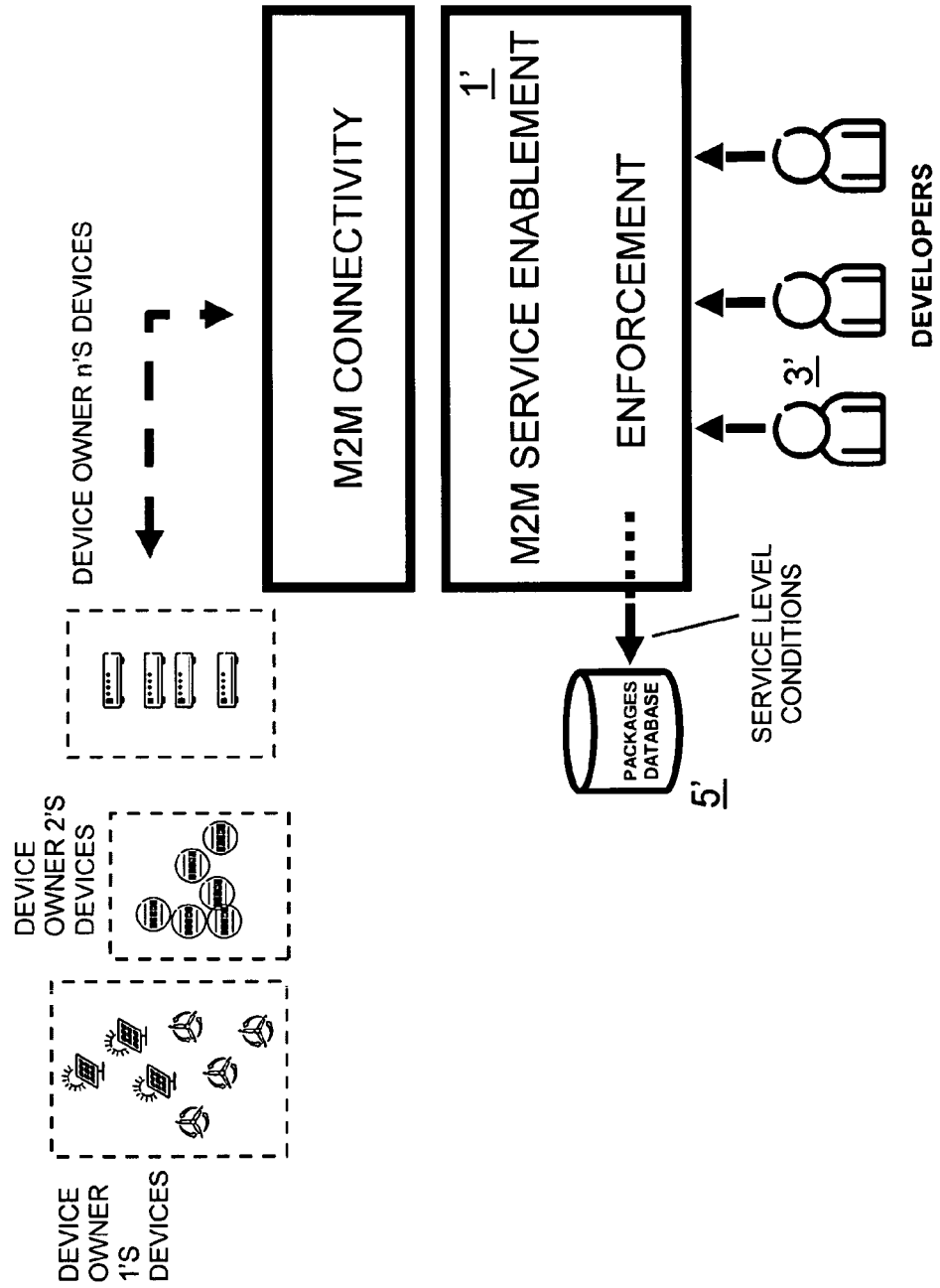

Once device data packages (both tentative and full-fledged) are created, their features may be stored in a database. This Packages Database 5' may be one of the components of the Device Data Store 4'. As shown in FIG. 3D, said features, once stored, may be accessed from the Marketplace in order to enable searches by developers. On the other hand, the service level conditions of said packages may be provided to the M2M Service Enablement platform for it to enforce said conditions. Such conditions may be pushed to the M2M Service Enablement platform or may be read by it from the database on demand (that is, whenever a request arrives to the M2M Service Enablement platform). Said conditions may be translated to policies understandable by the M2M SE platform.

Thus, the data distribution platform (Device Data Store) may comprise the two functional elements of the Marketplace 4' and the Packages Database 5'. Tight coupling between both elements may not be needed. Actual access to data streams and compilation (modification) of the same is provided by the M2M Service Enablement Platform 1'.

Figure 4B:
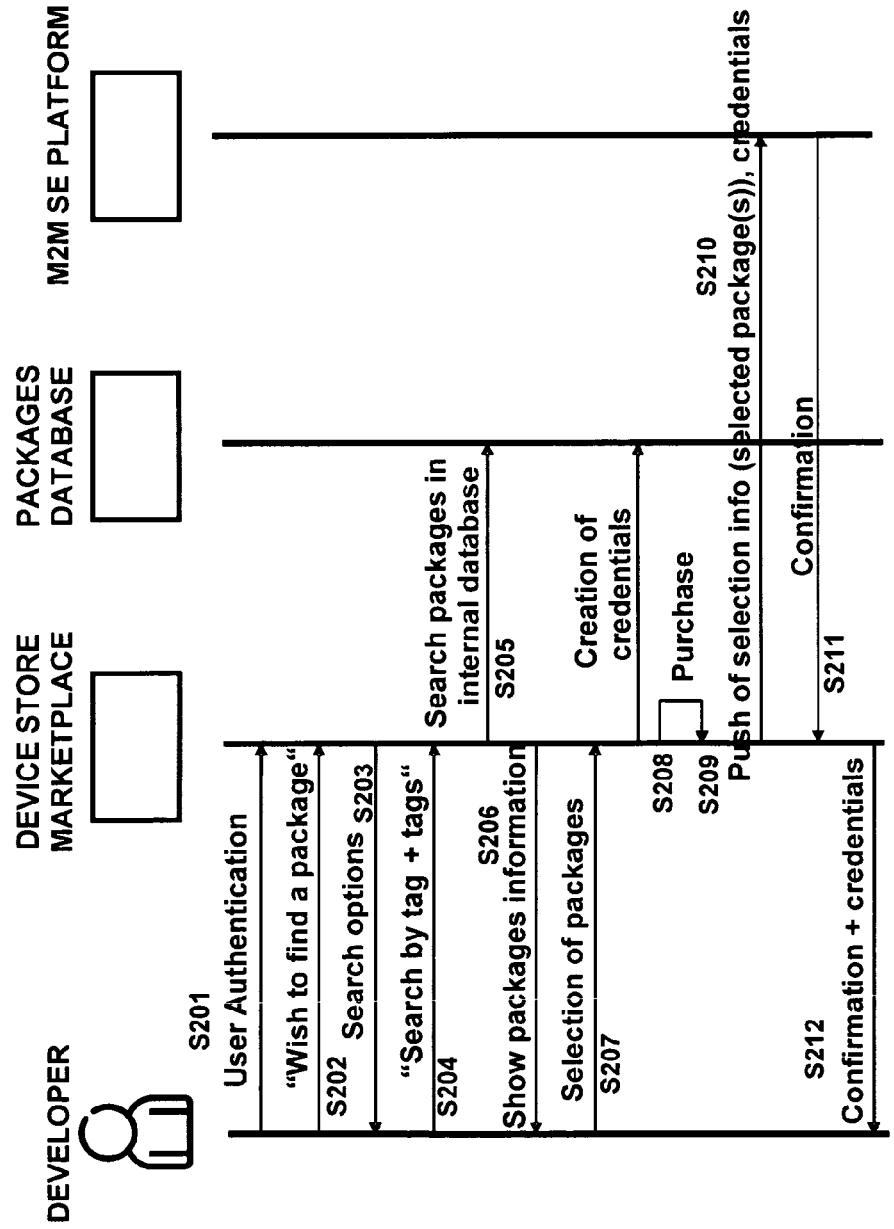
Figure 4C:
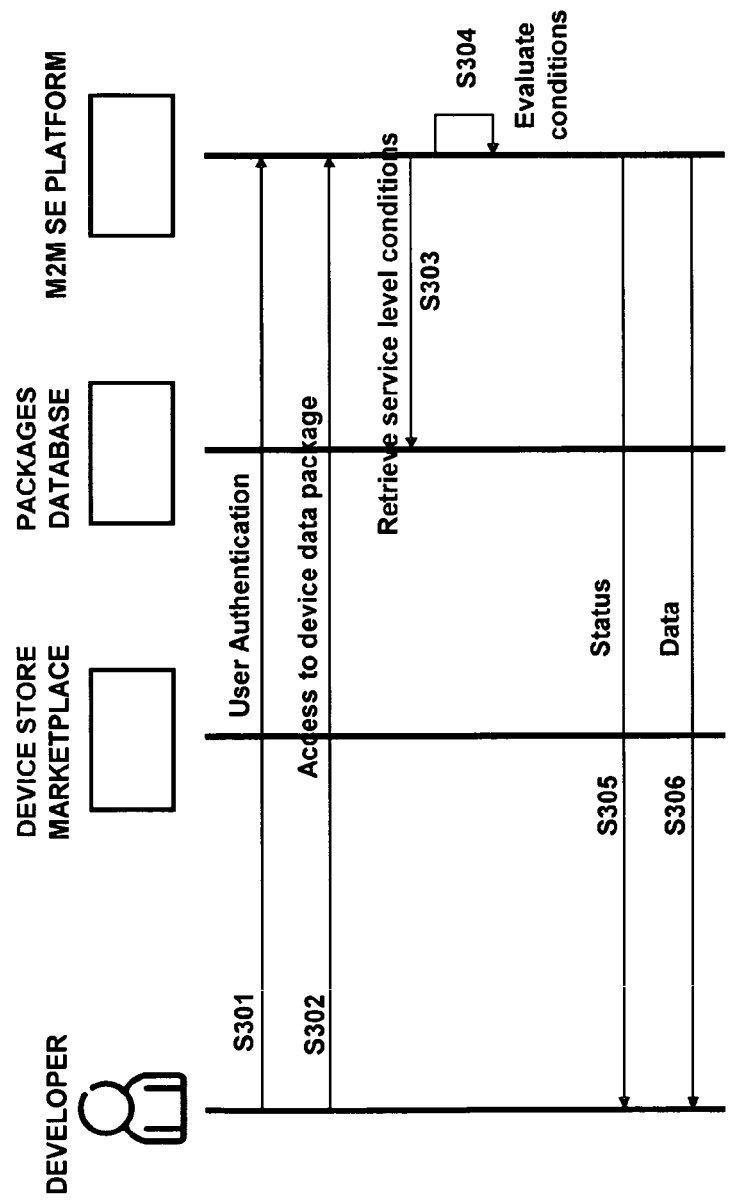
Figure 4D:
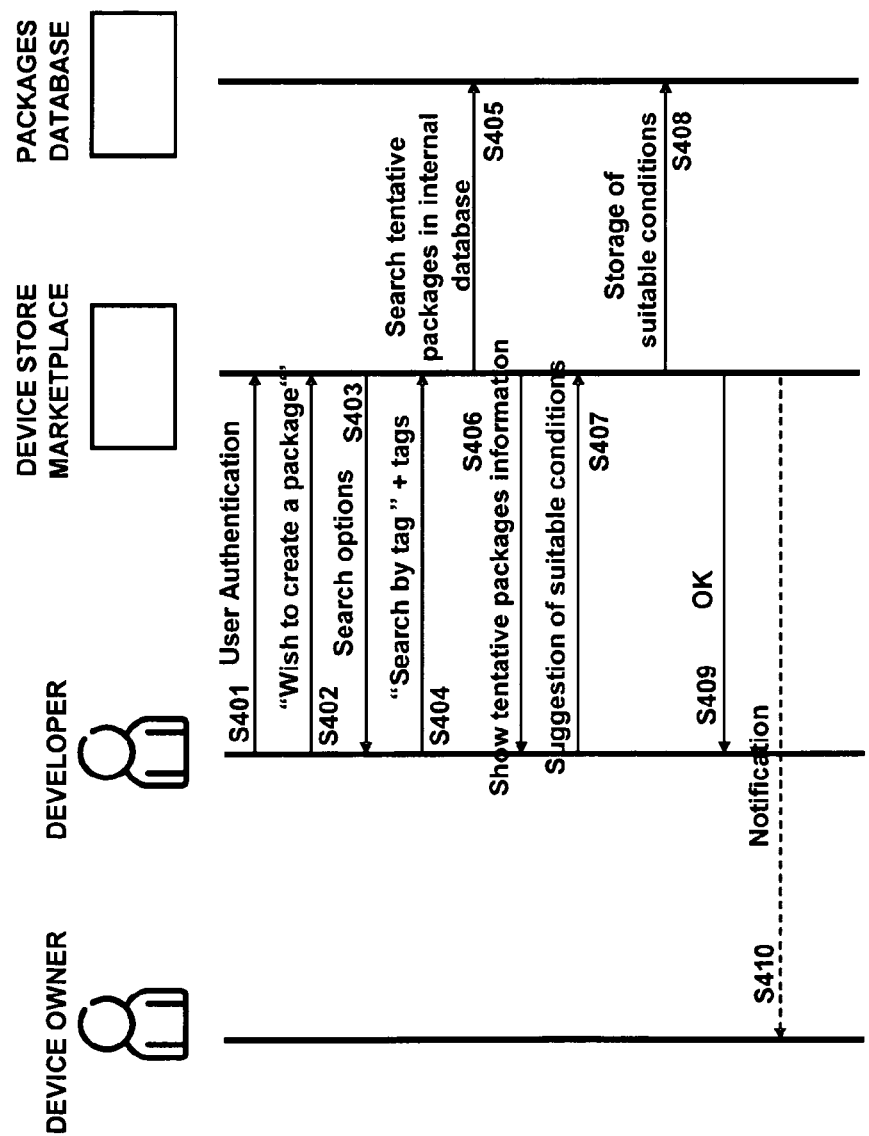
Figure 5A:
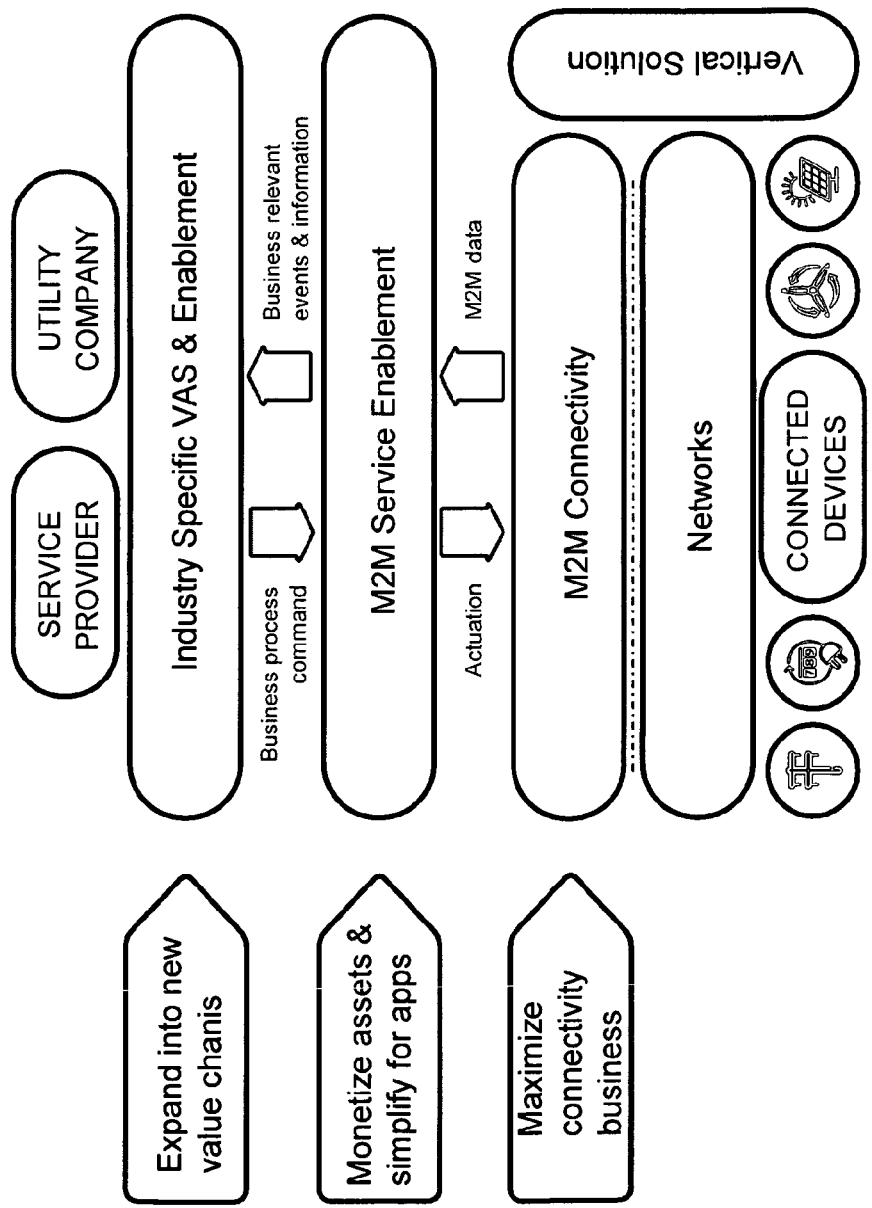
FIGS. 5A and 5B show schematic representations of M2M platform architectures and functionalities.
Figure 5B:
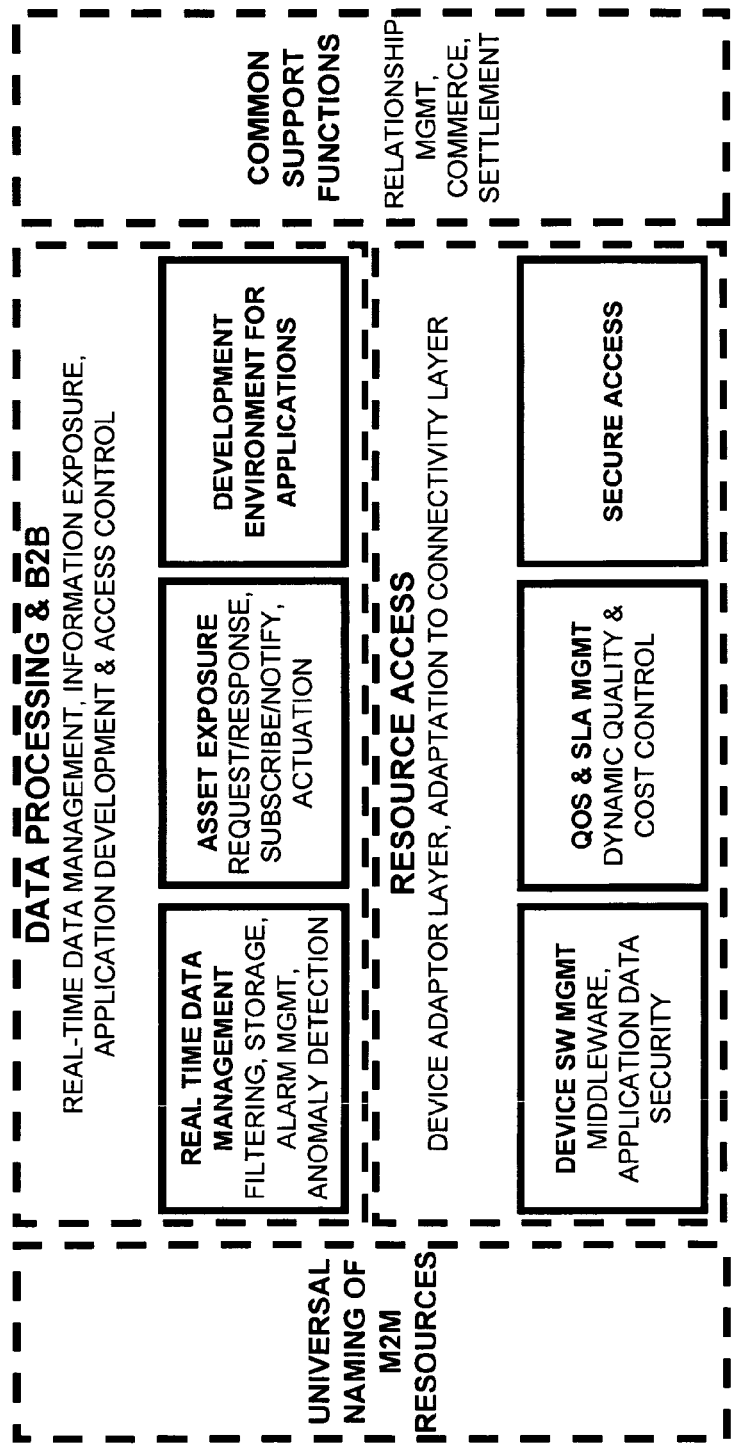

In the following, several use cases of the described exemplary embodiment of the present invention will be explained: one describing the creation of device data packages by device owners (FIGS. 3B and 4A); another describing the search for packages by developers at the market place (FIGS. 3C and 4B); and the actual access to packages through the M2M SE platform (FIGS. 3D and 4C). Additionally, the management of tentative device data packages is also described (FIG. 4D).

In the following, the creation of device data packages will be described with reference to FIG. 3D and, additionally, with reference to FIG. 4A. For this exemplary embodiment, it is assumed that a device owner has registered in the Device Data Market Place. It is also assumed that the device owner has previously established a relationship with the operators of the M2M Connectivity and the Service Enablement platforms, so that his/her devices are accessible through them and already available for him/her to create applications. It is therefore assumed that they are accessible through a standard API, using any kind of URI's, with an access control procedure and with the conditions established in the contract of the owner with the said operators. Finally, it is also assumed that there is a trust relationship between the Device Data Store 4' and the M2M Service Enablement platform 1', so that device owners can retrieve the information about their devices 2' being supported by the M2M Service Enablement platform and the data being provided by said devices (in terms of semantics, protocol, end-points, and service level conditions). As a result, the Device Data Store platform 4' may be able to offer information about their devices to the owner (said information being obtained from the Service Enablement platform 1').

Creation of device data packages can be done through a GUI (usually a web page) provided by the Device Data Marketplace 4', provided the device owner has got authenticated by means of the credentials previously agreed with the Device Data Store.

The description of the use case is described with specific reference to FIG. 4A: In step S101 the device owner accesses the Device Data Marketplace. It is assumed for the sake of simplicity, that he uses the same credentials than he uses at the Service Enablement platform (otherwise, a specific procedure for credential generation and identity linking between the device owner identity at both platforms may be provided). At step S102 he chooses the option "Creation of Device Data Packages" and in step S103 the Device Data Marketplace extracts the information about the owner's devices from the M2M Service Enablement platform. It uses the owner's identity as query key towards the SE platform. The information it retrieves is, at least: device identifier (meaningful identifier, usually assigned by the device owner when registering the device at the M2M SE platform), tags associated to the device (to enable searches), if existing, category, device URI (REST, RSS . . . ), API description (may be an XML file) and service level conditions (for instance, the sampling frequency).

In step S104, the Device Data Marketplace shows this information to the owner in a meaningful way. The Device Data Marketplace provides also the (graphical) means for the owner to create device data packages. In step S105, the device owner creates a device data package consisting of as many devices as s/he wish. Besides the devices the package comprises, it is also given a set of features by the device owner. As a first feature, a service level may be given. It defines the conditions under which the access to the package will be carried out by developers: for instance, the maximum number of clients of queries per hour, the sampling frequency, how fresh data is, that is, if the access can be performed in real-time or by accessing a database (belonging to the SE platform) recording past values of data. Another feature may be a set of tags. Each package can be assigned different tags enabling developers to discover the most suitable packages according to their requirements. For example, a developer trying to create a weather application for Stockholm would use tags such as "Stockholm" and "temperature". Finally, packages may have a price, which will be likely dependent on the service level. It is assumed that basic service levels could be free while more sophisticated ones, for example, real-time access, may have a higher price.

In step S106, once the package is created, its features (identifier, tags, categories and features of the devices the package comprises . . . ) are recorded in a specific database (Packages Database 5'). An internal identifier is generated before the package description is stored, so that it is possible to reference it.

In step S107, the device owner decides to activate the device data package, and in step S108, the status of the package in the database is updated according to the device owner decision. Optionally, in a step S109, device data package features may be translated into a set of policies (which can be applied by the M2M SE in further requests to sensors included into the package) and pushed to the M2M SE platform. This step is optional since there can be different embodiments: in one of them, policies are pushed to the M2M SE Platform and locally stored; in another embodiment, the M2M SE platform accesses the Packages Database when it receives requests from developers. As a further optional step S 110, if successful, the M2M SE platform may send back an OK status message. Finally, in step S111, the Device Data Marketplace shows a message stating that the defined packages have been activated and therefore are ready for selection by developers.

From that point on, developers willing to create new applications may be able to discover suitable packages (searching, for instance using tags) and then may use them to create their applications.

In the following, the use case of selecting device data packages in accordance with an exemplary embodiment of the present invention is described with reference to FIGS. 3C and 4B: Having been activated in accordance with the mechanism as described in conjunction with FIG. 4A, the device data packages are ready for selection by developers. The Device Data Marketplace plays the role of application store, but this time providing device data packages.

It is assumed that developers have run a registration procedure and thus created an account in the Device Data Store platform. Once authenticated, they access a GUT (usually a web page) that enables them to search packages according to different techniques. The most usual one would be based on tags (other possibilities may be location, for instance). The Device Data Marketplace may provide a tag cloud with most usual or most popular tags. Also, a regular "search by tag" functionality is provided.

As shown in FIG. 4B, the developer accesses the Device Data Marketplace and gets authenticated in a step S201, by means of a specific set of credentials associated to the Device Data Store site. In step S202, he chooses the option "Selection of Device Data Packages", and in step S203 several search options are shown (for instance, by tag, by location, by device owner, by price, by service level condition(s), combination of the aforementioned options . . . ).

In response to the choice of the option "Search by tag" and the input several tags as search arguments in step S204, the Device Data Marketplace accesses in step S205 the Packages Database to find the packages that match the terms introduced by developers. In step S206, the Device Data Marketplace shows the retrieved list of packages. The information shown to the developer must include the available service level conditions, the devices the package comprises, the type of devices, and their location if available.

In step S207, the developer chooses one or several packages and it follows in step S208 an optional purchase procedure, if the price is not null. In step S209 the Device Data Marketplace acknowledges the selection, and creates a specific set of credentials for the developer to further access through the M2M SE platform. In step S210 it delivers such information to the M2M SE platform, and if successful, the M2M SE platform sends back an OK status message in step S211. In step S212, the Device Data Marketplace delivers said information also to the developer. That information may include all the information needed by the developer to subsequently access data from the M2M SE platform for instance, end-point, syntax and so on). From this point on, the developer may access said packages.

Next, the use case of accessing device data generated by devices within a package in accordance with an exemplary embodiment of the present invention is described with reference to FIGS. 3D and 4C: Having been selected and optionally purchased, as described in conjunction with FIG. 4B above, the device data packages are ready for use by developers. The Device Data Marketplace may play no role in this use case.

It is assumed that developers have run a registration procedure and thus created an account in the M2M Service Enablement platform. Once authenticated, they can access the API exposing data coming from sensors belonging to a given package.

With specific reference to FIG. 4C, the developer gets authenticated to the M2M Service Enablement platform by means of a specific set of credentials in a step S301. He may do it usually by programmatic means. Once authenticated, the developer may access, in step S302, the URL giving access to the data belonging to devices within the device data packages he has selected and optionally purchased. The developer has obtained the necessary information to programmatically access data in the selection use case).

When the M2M SE platform receives the request in step S303, it retrieves the information about the device data packages the developer has selected and optionally purchased. In step S304 it verifies that the request is valid (it belongs to one of the packages he has selected and optionally purchased) and the service level conditions associated to the packages. If the evaluation of conditions is positive, the access to data may start in step S305 and in step S306 access to data is done according to service level conditions.

In the following, the management of tentative device data packages is described with reference to FIG. 4D. Namely, beyond the traditional publication/consumption model, the Device Data Store may also provide the mechanisms for developers to request for the creation of device data packages that do not exist yet. The cycle is similar to the ones described in conjunction with FIGS. 4A and 4B, but with several differences as set out below.

In a way, the Device Data Store may be able to present data stream information to developers, said information specifying possible selection criteria relative to the data points of one of the at least one data stream. Thus, the developer can derive from said information what data points (data content, physical quantities, data quality, accuracy, interval, etc.) are available. The developer can therefore formulate tentative selection criteria information and request that respective selection criteria are offered. A price offer may be included. Once the device owner accepts the proposal he can command to specify the selection criteria based on this tentative criteria information. Accordingly, stream request information is generated which a client (developer) can use for formulating the request. As a consequence, the client can obtain a data stream modified in line with on specific and desired criteria.

With regard to the creation of so-called tentative device data packages, the procedure is similar to that of the use case described in conjunction with FIG. 4A. However, when defining tentative device data packages, the device owner is not requested to include in them any actual device. He is not even requested to include specific service level conditions. The only elements he may be requested to define are tags (to allow developers to search for them) and tolerable service level conditions. Optionally, he can also define maximum prices for such tentative packages. The purpose of these tentative device data packages is to find out the demand of packages so that the packages are only created when there is actual demand for them.

On the other hand, the mechanisms for the search of tentative packages and to request their creation are similar to those described in conjunction with FIG. 4B. However, there are some differences that are described in conjunction with FIG. 4D. First, the developer accesses the Device Data Marketplace and gets authenticated in step S401, by means of a specific set of credentials associated to the Device Data Store site.

In the next step S402, he chooses the option "Creation of Device Data Packages", and in step S403 several search options are shown (by tag, by location, by device owner, or by combination of the aforementioned options . . . ). In step S404 he may choose the option "Search by tag" and introduces several tags as search arguments. Accordingly, the Device Data Marketplace accesses in step S405 the Packages Database to find the tentative packages that match the terms introduced by developers, and in step S406 the Device Data Marketplace shows the options that match the criteria set by the developers in their search operations. The information shown to the developer includes, at least, the available service level conditions and the prices associated to such service level conditions.

In step S407, the developer chooses one or several tentative packages setting the conditions that suit better his/her needs. The chosen features are recorded in the Packages Database in step S408, however not as regular packages but as templates of actual device data packages.

In step S409, the developer may receive an OK statement, providing information about when his/her request will be answered. By any means (short messages, notification when accessing his/her account at the Device Data Marketplace), the device owner may receive in a step S410 a notification about the request for creation of actual device data packages. The actual creation of packages may then follow the procedure as described in conjunction with FIG. 4A.

Embodiments of the present invention may provide one or more of the following advantages:

First, the Device Data Store provides a fine-grained model for accessing data coming from sensors. It provides the definition of different types of device data packages with different service level conditions, even referring to the same devices (Device Package A can include all the meteorological stations in London, with data update every hour; Device Package B comprises the same set of devices but providing updated measures every minute).

Secondly, the Device Data Store may enable developers to play a more active role, not being a mere consumer of what has been published by device owners, but an active requester of packages.

Further, by allowing the client device to indicate the modification information to the processing unit, the client is enabled to specify in a finely tuned manner the subset of data points of streams that he wants to receive. Since this specification takes places at the distribution site, the amount of data can be reduced before transmission to the client device takes place. Consequently, only the data that the client is really interested in may be transmitted and the client does not have to allocate unnecessary resources for receiving and processing data that he has no use for. Additionally, in a similar manner, from the perspective of the distribution system, the above described processing entity is advantageous, since it avoids, or at least reduces, an unnecessary transmission of data by the transmission unit.

Furthermore, in the processing entity may be provided with very specific information regarding the data that will have to be transmitted to the client devices. As such, it becomes possible to estimate the dimensioning of the distribution system with a greater precision and the allocation of excess system capacity can be reduced.

Although detailed embodiments have been described, these only serve to provide a better understanding of the invention defined by the independent claims, and are not to be seen as limiting.

The invention claimed is:

1. A processing entity comprising a processing unit and a memory coupled to the processing unit and comprising non-transitory program code, wherein the processing unit is configured by the program code to:
  receive one or more streams of data points from at least one external data generating device that is remote from the processing entity, wherein the data points in the one or more streams of data points represent a measured physical quantity;
  receive, from a client device, a stream request indicating at least one of the data streams and including information indicating a stream modification;
  translate the information indicating a stream modification to selection criteria relative to the data points of the at least one data stream;
  receive the at least one data stream from the external data generating device;
  modify the at least one data stream by filtering the data stream based on the translated selection criteria, wherein filtering the data stream comprises selecting a subset of data points of the stream to provide a filtered data stream that comprises a subset of data points that represent the measured physical quantity,
  wherein the selection criteria comprises any one of:
    a maximum number of times per hour a client device is provided with data points, a maximum number of client devices accessing the data points, a maximum sampling frequency of the data points, a timestamp associated with the data points, quality of service parameters associated with the data points, and access rights associated with client devices;
  provide the modified data stream to the client device; and
  issue a command to network equipment, based on the received stream request, for specifying a predetermined target quality of service for the network equipment providing the modified data stream to the client device.

2. The processing entity according to claim 1, wherein the stream request includes information identifying the client and the processing unit is further configured to provide the modified data stream only to the client device identified by said information included in the stream request.

3. The processing entity according to claim 1, wherein, when translating the information indicating a stream modification to selection criteria, the processing unit is configured to access a database.

4. The processing entity according to claim 1, wherein the processing entity comprises a storage unit and the processing unit is further configured to store the one or more streams of data points.

5. The processing entity according to claim 4, wherein the processing unit is further configured to, when modifying a data stream, append data points of the one or more stored streams.

6. The processing entity according to claim 1, wherein the data points are discrete data points.

7. The processing entity according to claim 6, wherein the discrete data points include data point identification information and data point value information.

8. The processing entity according to claim 1, wherein the processing unit is further configured to authenticate a client device from which stream request information is received.

9. The processing entity according to claim 1, wherein the processing entity is part of a machine to machine service enablement platform.

10. A processing entity comprising a processing unit and a memory coupled to the processing unit and comprising non-transitory program code, wherein the processing unit that is configured by the program code to:
  receive authentication information indicating access rights to selection criteria relative to data points of one of at least one data stream of the data points generated by an external data generating device that is remote from the processing entity wherein the data points in the at least one stream of data points represent a measured physical quantity,
  wherein the selection criteria comprise any one of:
    a maximum number of times per hour a client device is provided with data points, a maximum number of client devices accessing the data points, a maximum sampling frequency of the data points, a timestamp associated with the data points, quality of service parameters associated with the data points, and access rights associated with client devices;
  grant access to the selection criteria relative to the data points of the at least one data stream based on the access rights;
  receive a command to specify the selection criteria; and
  generate stream request information indicating a stream request, the stream request indicating the at least the one data stream and including information indicating a stream modification based on the specified selection criteria, wherein the stream modification comprises selecting a subset of data points of the at least one stream to provide a filtered data stream that comprises a subset of data points that represent the measured physical quantity.

11. The processing entity according to claim 10, wherein the processing unit is further configured to:
  provide information on the stream request information to a client device;
  receive a command selecting the stream request information from the client device;

generate access information indicating the client device from which the command is received and indicating the specified stream request information; and to provide the access information to the client device.

12. The processing entity according to claim 10, wherein the processing entity is further configured to store the stream request information.

13. The processing entity according to claim 10, wherein the processing unit is further configured to:
receive a request for specifying the selection criteria; and
to generate the stream request information so that the stream request includes information indicating a stream modification based on the selection criteria specified from the request.

14. The processing entity according to claim 13, wherein the processing unit is configured to receive the request from a client device and to forward the generated stream request information to the client device from which the request was received.

15. The processing entity according to claim 10, wherein the processing unit is further configured to receive tentative criteria information indicating requested selection criteria relative to the data points of one of at least one data stream of data points, and wherein the received command specifies the selection criteria based on the requested selection criteria.

16. The processing entity according to claim 15, wherein the processing unit is further configured to present data stream information specifying possible selection criteria relative to the data points of one of the at least one data stream.

17. A system for providing a data distribution platform comprising a processing entity with a processing unit and a memory coupled to the processing unit and comprising non-transitory program code, wherein the processing unit that is configured by the program code to:
receive one or more streams of data points from at least one external data generating device that is remote from the processing entity;
receive, from a client device, a first stream request indicating at least one of the data streams and including information indicating a stream modification wherein the at least one of the data streams comprises data points that represent a measured physical quantity;
translate the information indicating a stream modification to selection criteria relative to the data points of the at least one data stream,
wherein the selection criteria comprise any one of:
a maximum number of times per hour a client device is provided with data points, a maximum number of client devices accessing the data points, a maximum sampling frequency of the data points, a timestamp associated with the data points, quality of service parameters associated with the data points, and access rights associated with client devices;
receive the at least one data stream from the external data generating device;
modify the at least one data stream by filtering the data stream based on the translated selection criteria, wherein filtering the data stream comprises selecting a subset of data points of the stream to provide a filtered data stream that comprises a subset of data points that represent the measured physical quantity;
provide the modified data stream to the client device;
issue a command to network equipment, based on the received stream request, for specifying a predetermined target quality of service for the network equipment providing the modified data stream to the client device;
receive authentication information indicating access rights to the selection criteria relative to the data points of one of the one or more streams;
grant access to the selection criteria relative to the data points of the one of the one or more streams based on the access rights;
receive a command to specify the selection criteria; and
generate stream request information indicating a second stream request indicating a data stream and including information indicating a stream modification based on the specified selection criteria.

18. A method of operating a processing entity comprising a processing unit, the method comprising:
receiving one or more streams of data points from at least one external data generating device that is remote from the processing entity;
receiving, from a client device, a stream request indicating at least one of the data streams and including information indicating a stream modification wherein the at least one of the data streams comprises data points that represent a measured physical quantity;
translating the information indicating a stream modification to selection criteria relative to the data points of the at least one data stream,
wherein the selection criteria comprise any one of:
a maximum number of times per hour a client device is provided with data points, a maximum number of client devices accessing the data points, a maximum sampling frequency of the data points, a timestamp associated with the data points, quality of service parameters associated with the data points, and access rights associated with client devices;
receiving the at least one data stream from the external data generating device;
modifying the at least one data stream by filtering the data stream based on the translated selection criteria, wherein filtering the data stream comprises selecting a subset of data points of the stream to provide a filtered data stream that comprises a subset of data points that represent the measured physical quantity;
providing the modified data stream to the client device; and
issuing a command to network equipment, based on the received stream request, for specifying a predetermined target quality of service for the network equipment providing the modified data stream to the client device.

19. The method of claim 18, wherein the stream request includes information identifying the client and the processing unit is further configured to provide the modified data stream only to the client device identified by said information included in the stream request.

20. A method of operating a processing entity comprising a processing unit, the method comprising:
receiving authentication information indicating access rights to selection criteria relative to data points of one of at least one data stream of the data points generated by an external data generating device that is remote from the processing entity wherein the data points in the at least one data stream of data points represent a measured physical quantity,
wherein the selection criteria comprise any one of:
a maximum number of times per hour a client device is provided with data points, a maximum number of client devices accessing the data points, a maximum sampling frequency of the data points, a timestamp associated with the data points, quality of service parameters associated with the data points, and access rights associated with client devices;

granting access to the selection criteria relative to the data points of the at least one data stream based on the access rights;

receiving a command to specify the selection criteria; and generating stream request information indicating a stream request, the stream request indicating at least the one data streams and including information indicating a stream modification based on the specified selection criteria, wherein the stream modification comprises selecting a subset of data points of the at least one stream to provide a filtered data stream that comprises a subset of data points that represent the measured physical quantity.

21. The method of claim 20 adapted to operate a processing entity to:

provide information on the stream request information to a client device;

receive a command selecting the stream request information from the client device;

generate access information indicating the client device from which the command is received and indicating the specified stream request information; and to provide the access information to the client device.

22. A non-transitory computer program product comprising computer program code loadable into a processing unit of a processing entity, the computer program code performing, when being executed on the processing unit, the steps comprising:

receiving authentication information indicating access rights to selection criteria relative to data points of one of at least one data stream of the data points generated by an external data generating device that is remote from the processing entity wherein the data points in the at least one data stream of data points represent a measured physical quantity, wherein the selection criteria comprise any one of:

a maximum number of times per hour a client device is provided with data points, a maximum number of client devices accessing the data points, a maximum sampling frequency of the data points, a timestamp associated with the data points, quality of service parameters associated with the data points, and access rights associated with client devices;

granting access to the selection criteria relative to the data points of the at least one data stream based on the access rights;

receiving a command to specify the selection criteria; and generating stream request information indicating a stream request, the stream request indicating at least the one data stream and including information indicating a stream modification based on the specified selection criteria, wherein the stream modification comprises selecting a subset of data points of the at least one stream to provide a filtered data stream that comprises a subset of data points that represent the measured physical quantity.

\* \* \* \* \*